(12) United States Patent
Muranami et al.

(10) Patent No.: US 6,233,343 B1
(45) Date of Patent: May 15, 2001

(54) POWER ADAPTER HAVING A SPEAKER FOR AN ELECTRONIC DEVICE

(75) Inventors: Masahiko Muranami, San Jose, CA (US); Scott N Hickman, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/938,264

(22) Filed: Sep. 26, 1997

(51) Int. Cl.$^7$ .................................. H04R 3/00; H05K 7/00
(52) U.S. Cl. .............................. 381/96; 361/683; 361/679
(58) Field of Search ....................... 381/96, 391; 361/685, 361/686, 683, 679; 320/111

(56) References Cited

U.S. PATENT DOCUMENTS

| | | | |
|---|---|---|---|
| D. 320,018 | * 9/1991 | Bakanowsky, III | D14/172 |
| 4,684,870 | * 8/1987 | George et al. | 320/20 |
| 4,953,223 | * 8/1990 | Householder | 381/188 |
| 4,969,046 | * 11/1990 | Sugimoto et al. | 358/254 |
| 5,025,885 | * 6/1991 | Froeschle | 181/156 |
| 5,546,468 | * 8/1996 | Beard | 381/86 |
| 5,604,663 | * 2/1997 | Shin et al. | 361/686 |
| 5,610,992 | 3/1997 | Hickman | 381/386 |
| 5,648,712 | * 7/1997 | Hahn | 320/2 |
| 5,680,465 | * 10/1997 | Boyden | 381/309 |
| 5,734,254 | * 3/1998 | Stephens | 320/106 |
| 5,777,512 | * 7/1998 | Tripathi et al. | 330/207 A |
| 5,802,194 | * 9/1998 | Yamagishi et al. | 381/188 |
| 5,805,672 | * 9/1998 | Barkat et al. | 379/67 |
| 5,847,541 | * 12/1998 | Hahn | 320/111 |
| 5,847,922 | * 12/1998 | Smith et al. | 361/685 |
| 6,029,072 | * 2/2000 | Barber | 455/557 |
| 6,031,825 | * 2/2000 | Kaikuranta et al. | 370/296 |
| 6,035,221 | * 3/2000 | Snyder et al. | 455/569 |

FOREIGN PATENT DOCUMENTS

| | | | | |
|---|---|---|---|---|
| 0334217A2 | * | 9/1989 | (EP) | H04R/1/28 |
| 0816973A1 | * | 1/1998 | (EP) | G06F/1/16 |

OTHER PUBLICATIONS

Journal of the Audio Engineering Society May 1971, vol. 19, No. 5, "Loudspeakers in Vented Boxes: Part I" Author A. N. Thiel.

Journal of the Audio Engineering Society Jun. 1971, vol. 19, No. 6, "Loudspeakers in Vented Boxes: Part II" Author A. N. Thiel.

* cited by examiner

Primary Examiner—Forester W. Isen
Assistant Examiner—Brian Tyrone Pendleton
(74) Attorney, Agent, or Firm—Timothy F. Myers

(57) ABSTRACT

A power adapter for an electronic device, such as a notebook computer, includes a speaker to generate low audio frequencies, such as below 150 Hz. The speaker can be mounted in a variety of arrangements, i.e. closed-box, bass-reflex, or a more intricate shape which adds resonance (poles and zeros) to the acoustic filtering properties of the enclosure. An exemplary bass-reflex mounting includes a driver with resonance at 140 Hz, a chamber size of 7.74 in$^3$ and a port determined by Thiele-Small equations. This gives a low frequency response beginning at 70 Hz. This low frequency component is combined in free space with the higher frequency components emanating from the portable electronic device's internal speaker(s). The audio signal connection can be made when the AC adapter is connected to the notebook computer by using two additional wires in the power cord. Since users generally carry their AC adapters with them, they can enjoy full harmonic sound without taking anything extra along. Alternatively, the AC adapter and electronic device can contain additional circuitry to provide wireless paths for either the power distribution path or audio interface or both.

3 Claims, 8 Drawing Sheets

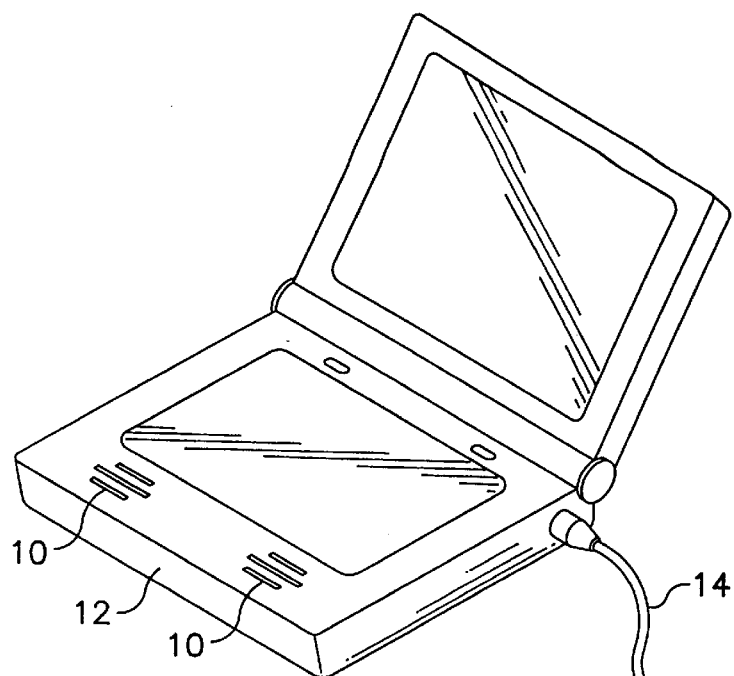
FIG.1
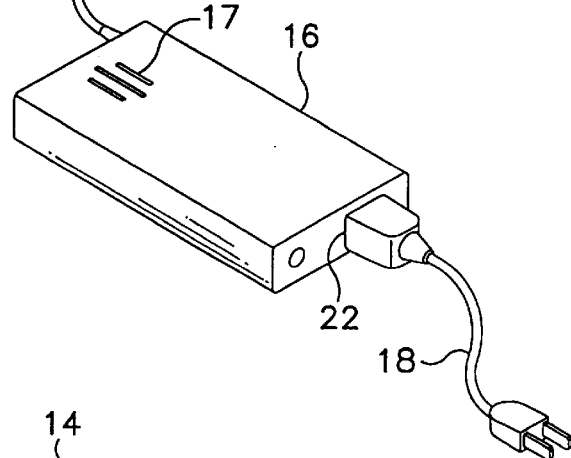
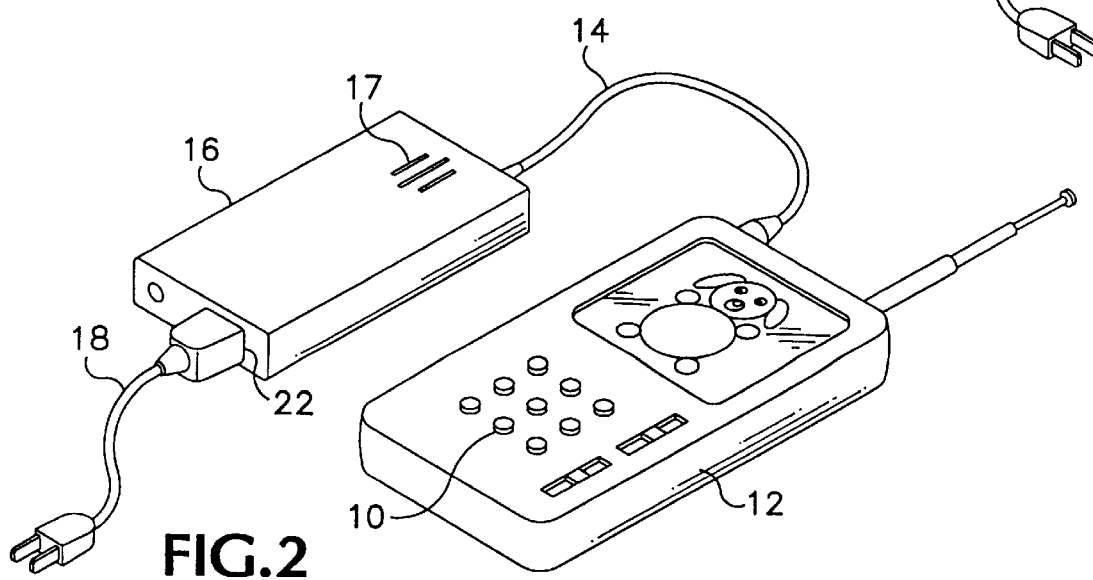
FIG.2

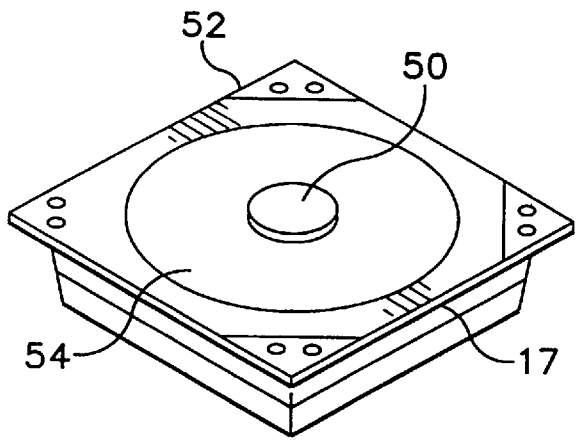
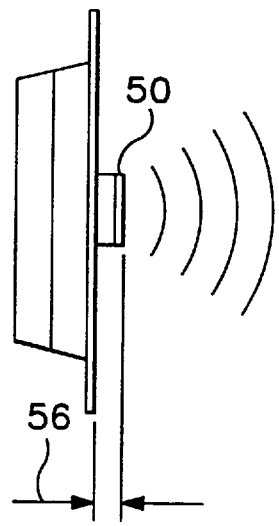
FIG.4A
FIG.4B
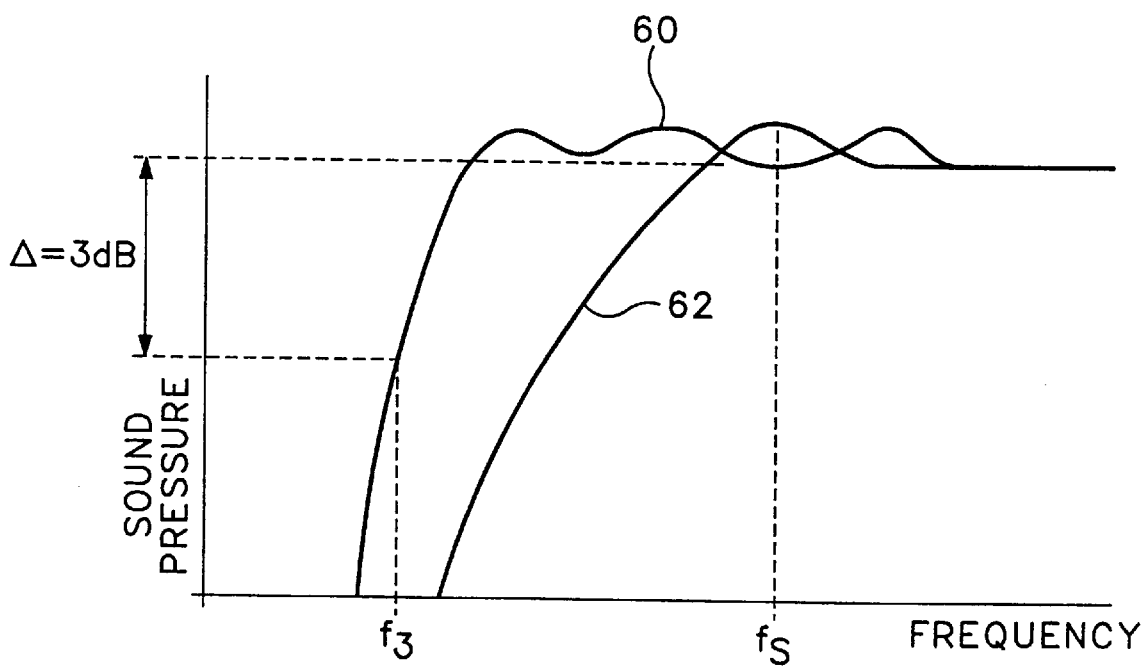
FIG.5

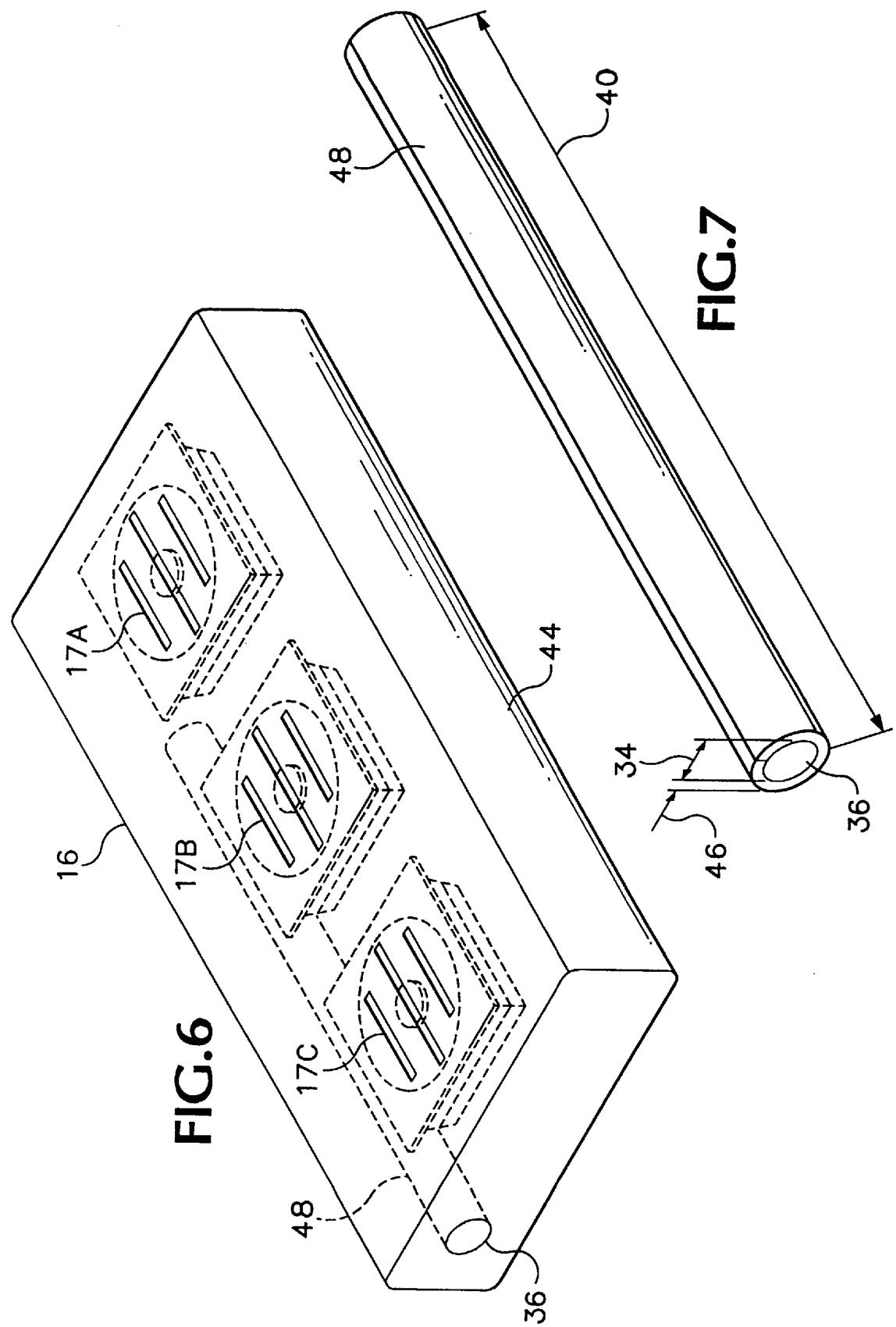

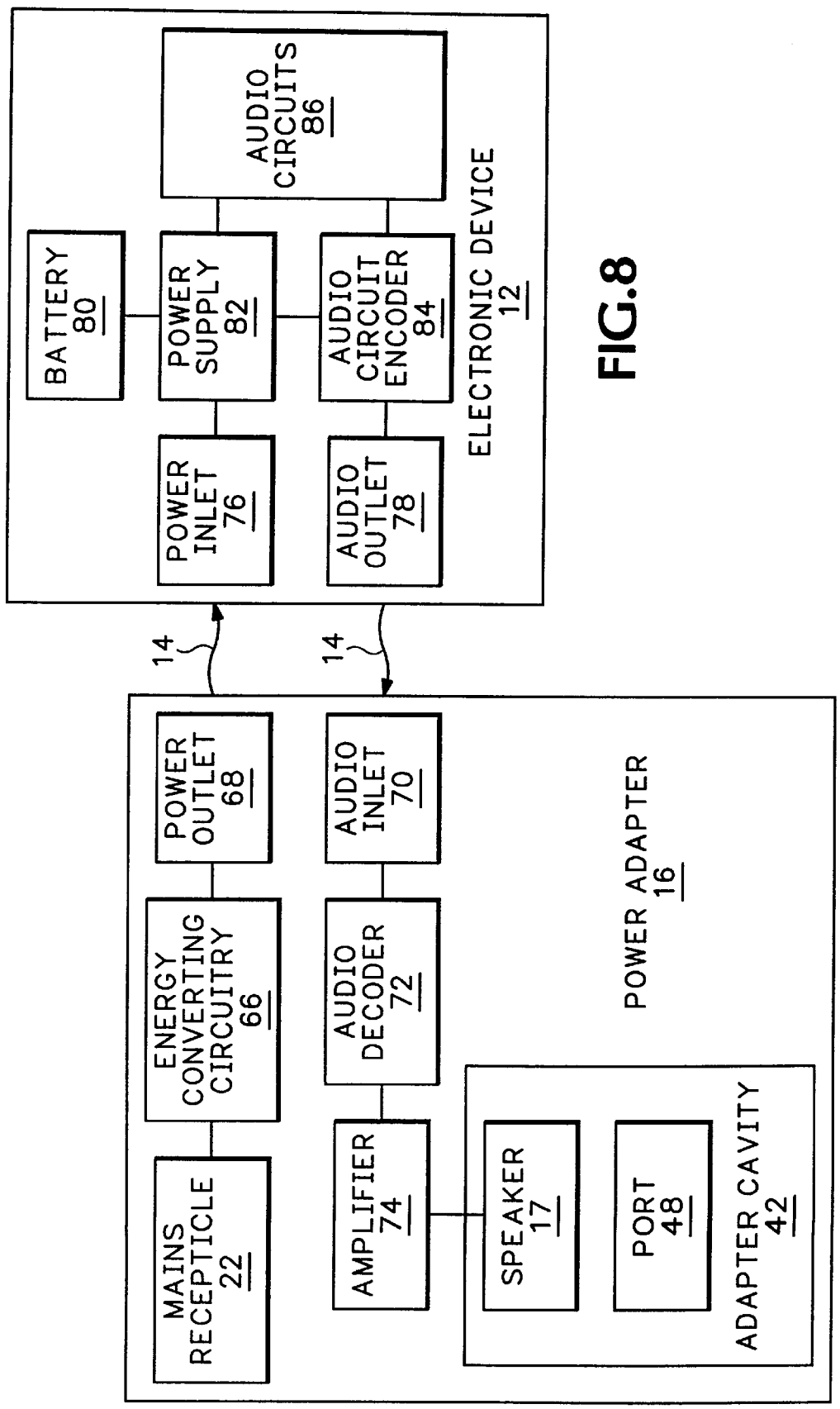

POWER ADAPTER HAVING A SPEAKER FOR AN ELECTRONIC DEVICE

BACKGROUND OF THE INVENTION

Electronic devices, such as notebook computers, are now being designed to operate with multi-media features such as those found in desktop units. In order for the user to have as enjoyable an experience as with desktops, the sound emanating from the notebook should present as full a harmonic content as the original sound. Most notebooks today currently are limited to not having frequencies generated below 150 Hz. Since most consumer audio equipment supports a frequency range of 20 Hz to 20 kHz, the full richness of the sound the user expects just is not present in notebook computers.

Notebook computers are limited in generating this low frequency content due to several factors. The first factor is that the space limitation in the product restricts how large a speaker may be used to replicate the sound. A second related factor is that lower frequencies need to move a large mass of air to be heard and there is little suitable volume in which to construct the air chamber that a speaker needs. A third factor is that due to the human ear's weak response to low frequency signals, more power is required to generate a lower frequency signal with an equivalent loudness compared to a signal greater than 150 Hz. More power reduces the battery life of the notebook computer or requires more expensive circuitry to implement than current designs.

Small electronic device makers such as notebook computer manufacturers or small handheld television producers continually fail to adequately provide a full, rich harmonic sound in their products.

SUMMARY OF THE INVENTION

A power adapter for an electronic device, such as a notebook computer, includes a speaker to generate low audio frequencies, such as below 150 Hz. The speaker can be mounted in a variety of arrangements, i.e. closed-box, bass-reflex, or a more intricate shape which adds resonance (poles and zeros) to the acoustic filtering properties of the enclosure. An exemplary bass-reflex mounting includes a driver with resonance at 140 Hz, a chamber size of 7.74 in$^3$ and a port determined by Thiele-Small equations. This gives a low frequency response beginning at 70 Hz. This low frequency component is combined in free space with the higher frequency components emanating from the portable electronic device's internal speaker(s). The audio signal connection can be made when the AC adapter is connected to the notebook computer by using two additional wires in the power cord. Since users generally carry their AC adapters with them, they can enjoy full harmonic sound without taking anything extra along. Alternatively, the AC adapter and electronic device can contain additional circuitry to provide wireless paths for either the power distribution path or audio interface or both.

BRIEF DESCRIPTION OF THE DRAWINGS

FIG. 1 shows an electronic device attached to the power adapter of the preferred embodiment of the invention.

FIG. 2 shows another electronic device attached to the power adapter of the preferred embodiment of the invention.

FIG. 4 shows the construction of the speaker element in the preferred embodiment of the invention.

FIG. 5 is a frequency response graph showing the benefits of the preferred embodiment of the invention over an alternative embodiment.

FIG. 6 shows an alternative embodiment of the invention using multiple speakers.

FIG. 7 shows the characteristics required of the speaker port used in the preferred embodiment of the invention.

FIG. 8 is a block diagram showing the electronic device and power adapter of the preferred embodiment of the invention.

DESCRIPTION OF THE PREFERRED AND ALTERNATE EMBODIMENTS

Figure 3:
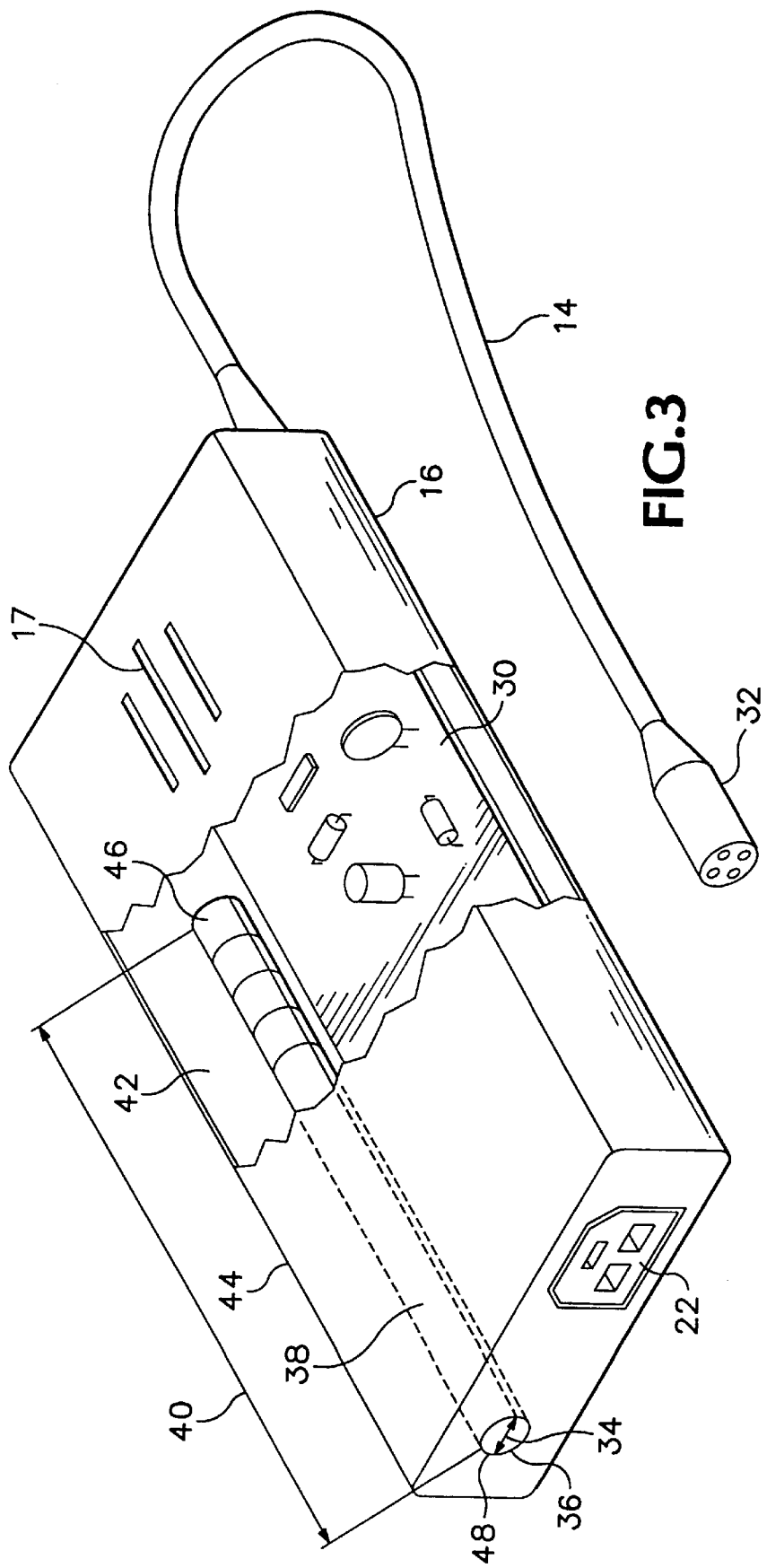
FIG. 3 shows the construction of the power adapter of the preferred embodiment of the invention.

FIG. 1 shows electronic device 12 as a notebook computer having internal speakers 10 connected to power adapter 16 via adapter cable 14. The power adapter 16 has mains receptacle 22 connected to AC mains via power cord 18. Inside power adapter 16 is speaker 17 that supplies low frequency audio from electronic device 12.

FIG. 2 shows electronic device 12 as a portable handheld TV that is connected to power adapter 16 through adapter cable 14. Power adapter 16 has internal speaker 17 and mains receptacle 22. Mains receptacle 22 is supplied mains AC power through power cord 18.

While electronic device 12 is shown above to be either a notebook computer or a portable TV, those skilled in the art will appreciate that electronic device 12 could be any small portable device capable of generating sound and still fall within the spirit and scope of the invention.

FIG. 3 shows power adapter 16 of the preferred embodiment in more detail. A cut-away shows adapter circuitry 30 and a sample of available air volume 42 in enclosure 44 of the adapter. Speaker 17 is preferably mounted on the top portion of power adapter 16 and includes speaker port 48. Speaker port 48 has cross sectional area 36, diameter 34, and length 40, which create port volume 38, enclosed within port wall 46. Adapter 16 connects to an electronic device via adapter cable 14 that terminates in adapter plug 32. External mains AC power is supplied to power adapter 16 through mains receptacle 22.

FIG. 4A shows speaker 17 used in power adapter 16 of the preferred embodiment of the invention in more detail. Speaker 17 consists of movable speaker cone 50 having area 54. Speaker 17 is attached to adapter 16 using speaker flange 52. Speaker cone 50 has a linear displacement movement 56 (FIG. 4B) that is related to the sound it is reproducing and the environment in which it is placed.

FIG. 5 is a graph comparing the low frequency response of a speaker in two different implementations. Response of closed-box adapter 62 has a very quick roll-off (6 dB per octave) below the characteristic frequency $f_s$ of the speaker. Response of the ported vent adapter 60 shows the relative increase in low frequency response below $f_s$ and the steeper roll-off (12 db per octive) from using this technique.

FIG. 6 shows power adapter 16 in an alternate embodiment that uses three speakers 17 (17A, 17B, 17C) in adapter enclosure 44 to get the desired bass response using speaker port 48 which has port vent 36. FIG. 7 shows more detail of port vent 36 that has length 40, cross-sectional area 36, and diameter 34. Port vent 36 is constructed such that it has wall thickness 46.

FIG. 8 is a block diagram of electronic device 12 and power adapter 16 in the preferred embodiment of the invention. Adapter 16 has mains receptacle 22 that interfaces to energy converting circuitry 66. The output of energy converting circuitry 66 is power outlet 68. In the preferred embodiment, energy converting circuitry 66 converts a high voltage mains AC signal (e.g. 110 or 220 volts) to a low voltage DC signal (e.g. 12 volts), although other types of energy conversion could be used and still found within the spirit and scope of the invention. Power outlet 68 is connected to power inlet 76 on electronic device 12 via cable 14 and it supplies energy to power supply 82, which may also receive energy from and charge battery 80. Power supply 82 is used by other circuitry in electronic device 12, including audio circuits 86. Audio circuits 86 generates an audio signal that optionally may be encoded in audio circuit encoder 84 before being sent to audio outlet 78. Adapter cable 14 is used to send the audio signal from audio outlet 78 to audio inlet 70 in power adapter 16. If the audio signal was encoded, it is decoded in audio decoder 72 before being sent to speaker 17. If additional bass boost is desired, the audio signal may be amplified first using optional audio amplifier 74. Power adapter 16 may have optional cavity 42 and optional port 48 that can be used to increase the low frequency response of speaker 17 without resorting to audio amplifier 74, or it may be used in combination with it.

Figure 9:
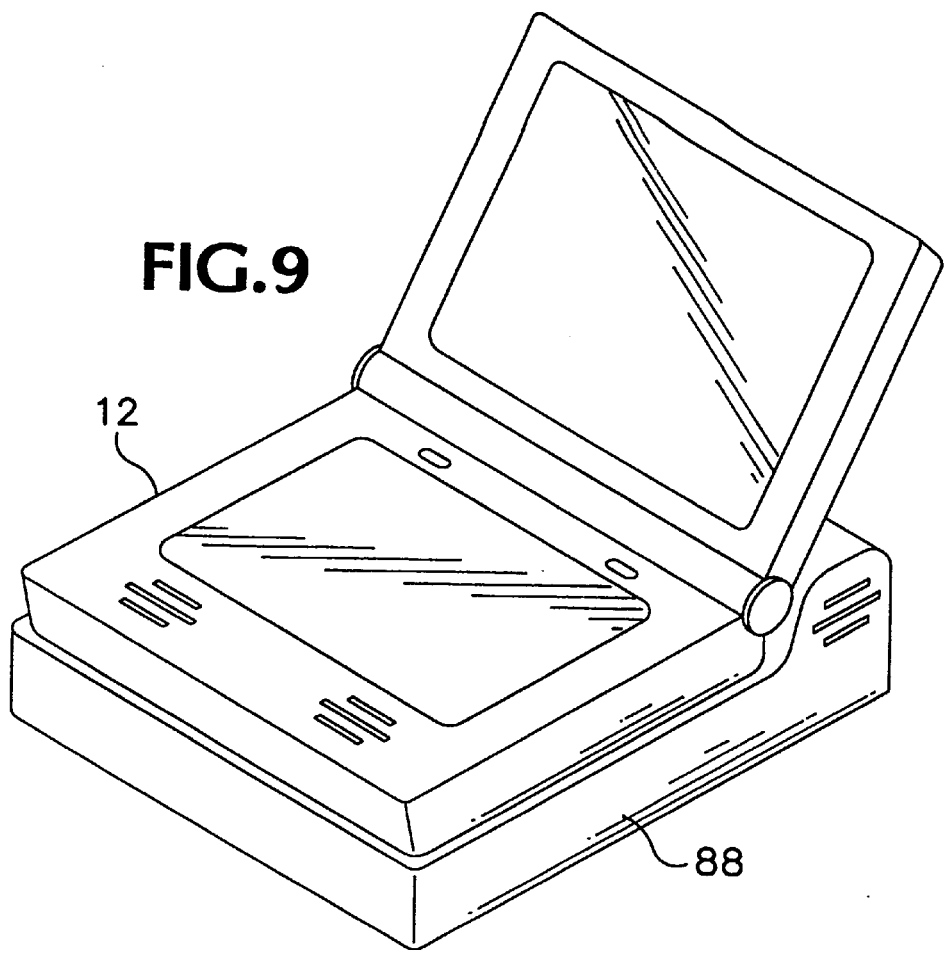
FIG. 9 and FIG. 10 show an alternative embodiment of the invention using wireless techniques.
Figure 10:
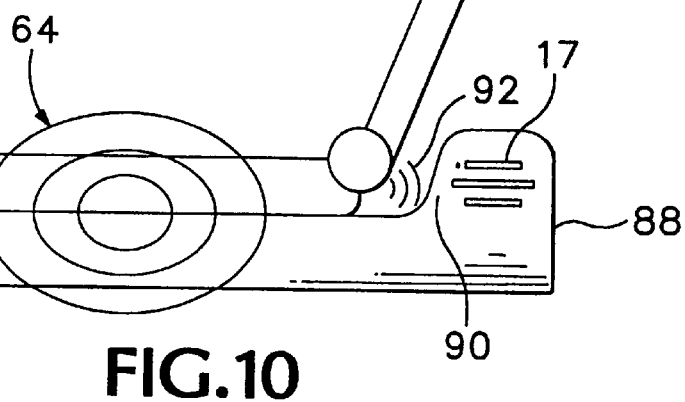

FIG. 9 shows an alternate embodiment of the invention which eliminates adapter cable 14, making it easier for the user to both power electronic device 12 and have better low frequency audio, using a wireless power adapter 88. The converted power can be transmitted to the electronic device using an electromagnetic coupled approach described in commonly assigned pending patent application Ser. No. 08/759,693 which is incorporated herein by reference. FIG. 10 shows how inductive charging field 64 couples energy from power adapter 88 into electronic device 12. Electronic device 12 generates the audio signal using an I/R beam 92 that is received by power adapter 88 with I/R pickup 90. Power adapter 88 includes speaker(s) 17.

Figure 11:
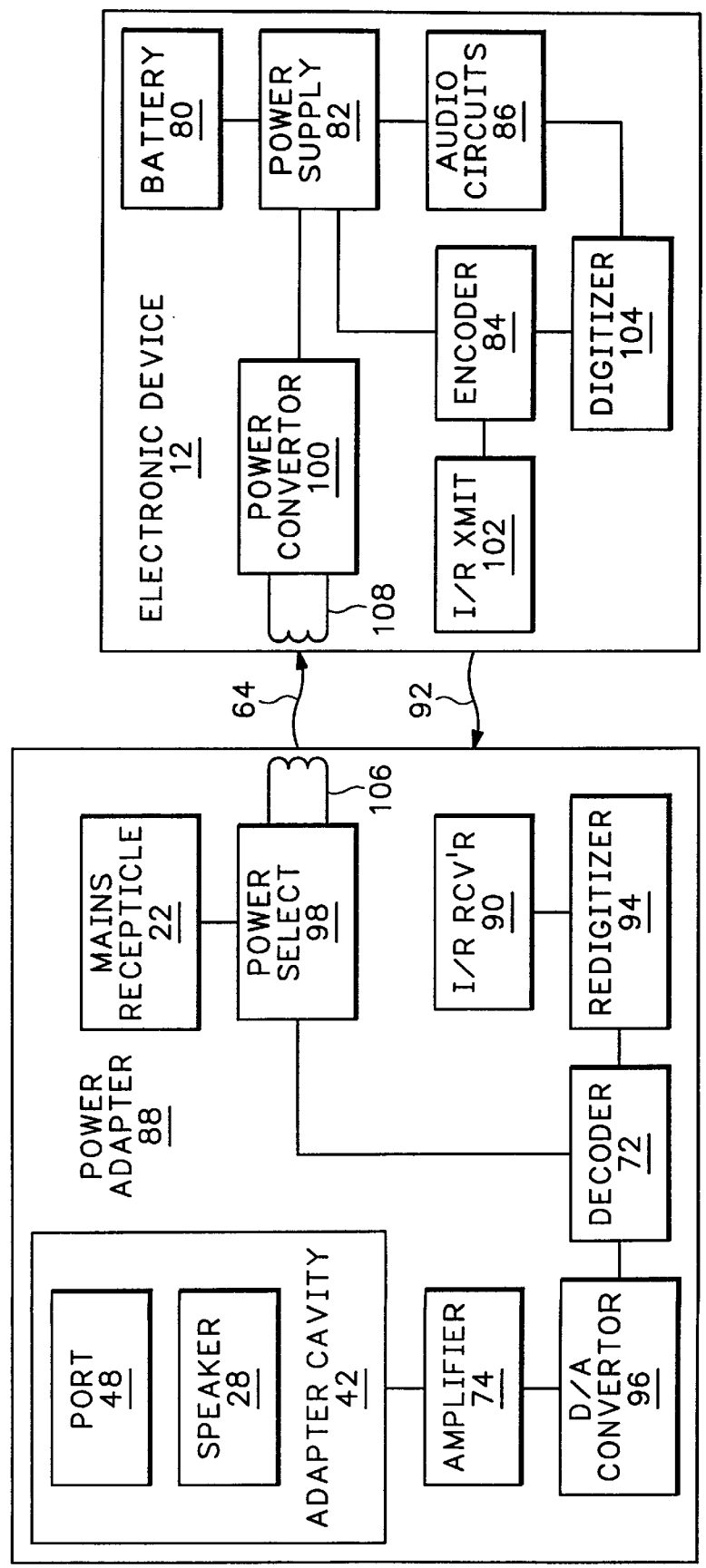
FIG. 11 shows a block diagram of an alternative embodiment of the invention using wireless techniques.

FIG. 11 is a block diagram of power adapter 88 and electronic device 12. Power adapter 88 has mains receptacle 22 which preferably couples AC power to power select charging circuit 98 which drives primary winding 106. The inductive energy in inductive charging field 64 is transferred to power converter pickup 100 via secondary winding 108 on electronic device 12 and onto power supply 82 which may also receive power from and charge battery 80. Power supply 82 provides power to the internal circuitry of electronic device 12 including audio circuits 86. To control charging of battery 80, status information from the battery charger in power supply 80 should be communicated to power adapter 88. Multiplexing battery status with the audio signal performs this communication. The audio signal is digitized in digitizer 104, encoded and multiplexed in encoder 84 with status from the battery charger in power supply 82 before being transmitted using I/R transmitter 102. I/R beam 92 is captured by I/R receiver 90 and reconverted into a digital signal via redigitizer 94. This digital audio signal is then decoded in decoder 72. The battery status is separated and sent to power select 98 circuit, and reconverted to an analog signal in D/A converter 96. This audio signal is then optionally amplified in amplifier 74 before reaching speaker 17.

Figure 12:
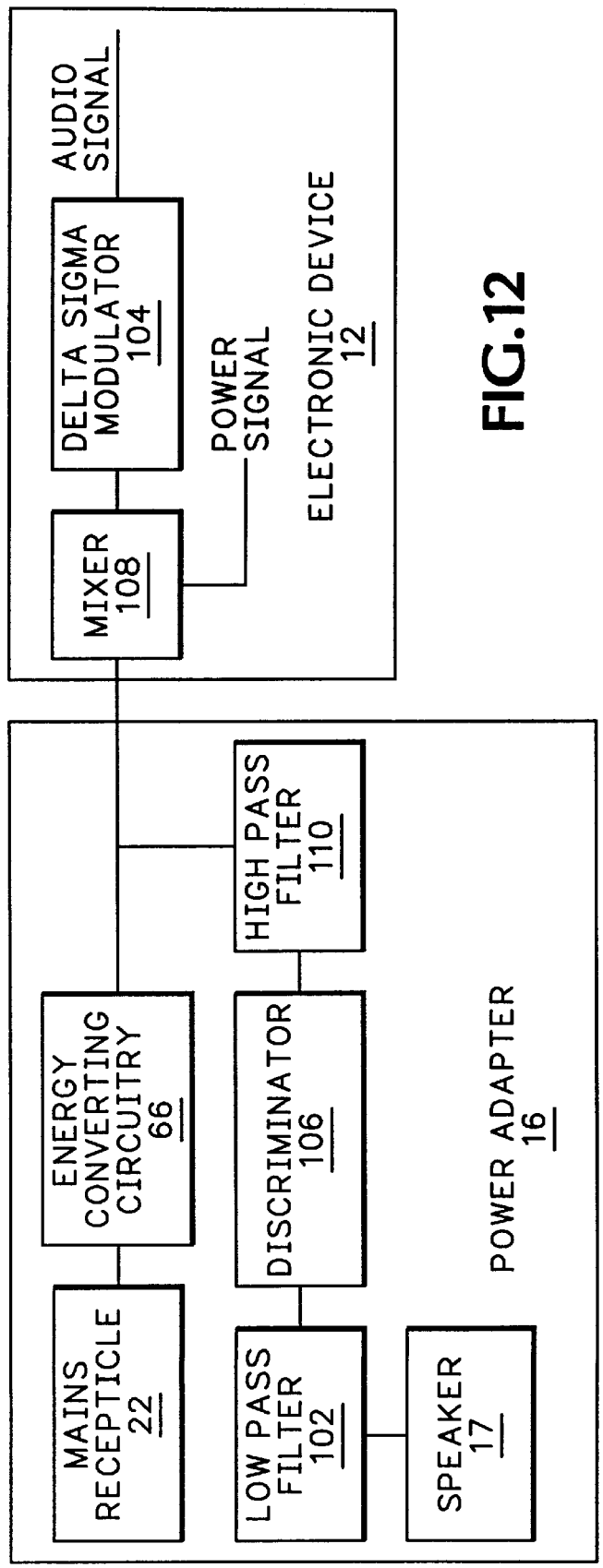
FIG. 12 shows a block diagram of an alternative embodiment of the invention using superposition techniques.

FIG. 12 shows power adapter 16 having mains recepticle 22 that supplies energy converting circuitry 66 which outputs a power signal. The power signal arrives at electronic device 12 where it has a modulated audio signal superimposed in mixer 108. The audio signal from electronic device 12 is converted in delta sigma modulator 104. The superimposed power signal is also received in power adapter 16. The modulated audio signal is separated in high pas filter 110 and reconverted into a modulated signal in discriminator 106. The audio signal is then recovered from the modulated signal in low pass filter 102 and sent to speaker 17.

To enhance the bass response of speaker 17, speaker 17 can be chosen such that its equivalent acoustical compliance $V_{as}$ is approximately equal to the volume of air which remains in adapter cavity 42 after subtracting the volume of the electrical components from the adapter inner volume. This results in a "closed-box subwoofer". Alternatively, the enclosure volume could be expanded or reduced to match the $V_{as}$ of the speaker if limited in choices of speaker selection. This approach will have a system effective low frequency response that is dependent upon the acoustical properties of the speaker and amplifier. Generally speaking, the system's effective frequency response will be slightly above the resonant characteristic frequency of the speaker, $f_s$, while designing to achieve a flat response.

A ported enclosure can further enhance the efficiency of the speaker at low frequencies. This type of enclosure, bass-reflex, achieves its efficiency by delaying the sound waves behind the speaker such that they become in phase with the sound waves emanating from the front of the speaker and thus the front and back sound waves combine in-phase by superposition. If designed properly, this approach allows the speaker to have an effective lower frequency response in addition to twice the efficiency of the closed box design. The design of the ported speaker enclosure, however, is more complex than the closed-box subwoofer. Use of a ported enclosure in a notebook computer system is shown in commonly assigned U.S. Pat. No. 5,610,992, incorporated by reference herein. To increase the efficiency of speaker 17 in power adapter 16, a ported speaker approach can be used by designing with the equations provided by N. Theile in his articles "Loudspeakers in Vented Boxes:Part I", Journal of the Audio Engineering Society, vol. 19, No. 5, pp. 382–392 (May 1971), and "Loudspeakers in Vented Boxes:Part II", Journal of the Audio Engineering Society, vol. 19, No. 6, pp. 471–483 (June 1971) also incorporated by reference herein.

There are two approaches that can be used. The first, an interative approach, is to determine what approximate volume of air is present in an adapter cavity and then determine the speaker parameters that are required to implement that solution, then adjusting the size of the adapter cavity to match design. The designated speaker can then be purchased if found in a catalog, or custom ordered to specification. Another approach is to select a desirable speaker (due to cost, availability, size, etc) from a catalog and using its supplied parameters determine if the speaker will match with the acoustical compliance of the adapter cavity. It may be desirable to use more than one speaker to achieve the required equivalent acoustical compliance match. Table 1 defines the terms used in the design calculations that follow.

TABLE 1

| Term | Definition |
| --- | --- |
| $V_{ab}$ | Volume of air in adapter cavity used for acoustical design. |
| $V_{as}$ | Equivalent acoustical compliance of speaker |
| $f_3$ | −3dB corner frequency of low frequency roll-off representing the system response |

TABLE 1-continued

| Term | Definition |
|---|---|
| $f_s$ | Resonant characteristic frequency of speaker |
| $f_b$ | Resonant frequency of adapter cavity, port and speaker defined as a resonant system |
| $Q_{ts}$ | Total electrical, mechanical and acoustical Q of speaker |
| $L_v$ | Length of vent in port |
| $S_v$ | Cross-sectional area of vent in port |
| $V_v$ | Volume of vent in port |
| $V_t$ | Total volume of adapter cavity and port vent, does not include components of adapter |
| $X_d$ | Displacement of speaker cone |
| $C_{as}$ | Acoustical compliance of speaker driver suspension |
| $C_{ab}$ | Acoustical compliance of air in adapter enclosure |
| $Q_t$ | Total system Q (a measure of acoustical dampening) |
| $S_d$ | Area of speaker driver cone |
| d | Diameter of vent including wall thickness |

For the first approach (see FIG. 3), to determine the ideal custom speaker (FIG. 4) for a given cavity it is important to determine the volume of open air 42 in the adapter. Typical adapters use about one third of the volumetric space for the circuitry 30 required to perform the energy conversion from the mains power source to the transformed power source which meets the voltage and current ratings of the portable electronic device. This leaves approximately two thirds of the adapter volume that can be used for lowering the dynamic range of the speaker. Assuming a typical adapter such as the Hewlett-Packard F1044B, having a physical size of 2.2 in by 1.2 in by 4.4 in or 11.6 in$^3$ of volume and approximately a $V_{ab}$=7.74 in$^3$(11.6×0.67). Then from Thiel (May 1971) (Table I on page 388) we chose that alignment which allows for a lower bass response than the speaker alone which is number 9 (FIG. 5), a Chebyshev fourth order design. The details provided from the table are $$\frac{f_3}{f_s} = 0.6, \quad \frac{f_3}{f_b} = 0.838, \quad Q_{ts} = 0.557, \quad \text{and} \quad \frac{V_{as}}{V_{ab}} = 0.485.$$

These details then give an equivalent acoustical compliance of the speaker of $V_{as}$=3.76 in$^3$. Choosing the lowest desired frequency of the system to be $f_3$=70 Hz, then $f_s$=117 Hz, $f_b$=117/0.838 or $f_b$=140 Hz. The required speaker parameters for the custom speaker are:

$V_{as}$=3.76 in$^3$, $f_s$=117 Hz, $Q_{ts}$=0.557.

Now we need to calculate the port dimensions required for achieving the desired frequency response we have chosen. From Thiel (May 1971), p. 391, equation 61 we can get the ratio of the length of the port vent to the cross-sectional area of the vent;

$$\frac{L_v}{S_v} = \frac{1.84 \times 10^8}{(2\pi f_b)^2 V_b} = \frac{1.84 \times 10^8}{(2\pi 140)^2 7.74} = 30.75.$$

If we choose the port vent length to be approximately 4 in. to fit within the enclosure, then $S_v$=0.13 in$^2$. To find the end correction of the vent, equation 65 of Thiel (May 1971) is used;

$$\left(\frac{L_v}{S_v}\right)_{end} = \frac{0.823}{\sqrt{S_v}} = \frac{0.823}{\sqrt{0.13}} = 2.28,$$

therefore;

$L_v$=(30.75−2.28)×0.13=3.7in.

The vent diameter can be found by adding the vent area and the thickness (assume 0.062in) of the vent wall;

$$d = 2\sqrt{\frac{S_v}{\pi}} + 2(0.062) = 2\sqrt{\frac{0.13}{\pi}} + 0.124 = 0.53 \text{ in.}$$

The volume of the vent is then;

$$V_v = \frac{\pi d^2 L_v}{4} = \frac{\pi (0.53)^2 (3.7)}{4} = 0.82 \text{ in}^3.$$

The adapter volume would then need to be increased to accommodate this port volume. If we keep the width (2.2 in.) and height (1.2 in.) constant and increase the length of the adapter by $$\frac{0.82 \text{ in}^3}{2.2 \text{ in} \times 1.2 \text{ in}} = 0.31 \text{ in } to \text{ } 4.71 \text{ in}$$

then the overall design is complete.

A different approach for implementation (see FIG. 6 and FIG. 7) would be to use standard speakers from a catalog and fit them into an adapter housing which already exists. Assume a larger standard adapter that is still a convenient size, that is 2.8 in by 1.5 in by 5.7 in or 24 in$^3$. If the electronic components again take up one third of the available volume, this leaves 16 in$^3$ of volume in which to design the ported speaker enclosure. A speaker with good low frequency characteristics is chosen from a catalog such as the speaker model number Panasonic 5H-13371 with the following specifications:

$f_s$=239 Hz, $V_{as}$=2.2 in$^3$, $Q_{ts}$=1.04, $S_d$=0.7 in$^2$.

From Thiel (May 1971) we again chose alignment #9 on p. 388 and use the following definitions for a forth order Chebyshev port design:

$$\frac{f_3}{f_s} = 0.6, \quad \frac{f_3}{f_b} = 0.838, \quad \frac{C_{as}}{C_{ab}} = 0.485, \quad Q_t = 0.557.$$

We can then determine the following specifications using three speakers:

$f_3 = 0.6 f_s = 0.6(239) = 143$ Hz $f_b = f_3/0.838 = 143/0.838 = 171$ Hz $V_{ab} = V_{as}/0.485 = 2.2/0.485 = 4.54$ in$^3$ $V_{ab} |_{3 \, speakers} = 13.6$ in$^3$ $$\frac{L_v}{S_v} = \frac{1.84 \times 10^8}{(2\pi f_b)^2 V_{ab}} = \frac{1.84 \times 10^8}{(2\pi(171))^2 13.6} = 11.7 \text{ in}^{-1}$$

From Thiel (May 1971), we want the port area to be approximately one fourth the area of the driver thus;

$$S_v = \frac{0.7}{4} = .175 \text{ in}^2$$

We now need to determine the blunt end correction factor;

$$\left(\frac{L_v}{S_v}\right)_{end} = \frac{0.823}{\sqrt{S_v}} = \frac{0.823}{\sqrt{0.175}} = 1.97$$

To determine the length of the vent;

$$L_v\big|_3 = \left(\left.\frac{L_v}{S_v}\right|_3 - \left(\frac{L_v}{S_v}\right)_{end}\right)S_v = (11.7 - 1.97)0.175 = 1.71 \text{ in.}$$

Assuming that the vent wall thickness is 0.062 in. then the port diameter is;

$$d = 2\sqrt{\frac{S_v}{\pi}} + 2(0.062) = 2\sqrt{\frac{0.175}{\pi}} + 0.124 = 0.6 \text{ in.}$$

The volume of the port is then;

$$V_v\big|_3 = \pi(0.3)^2 1.71 = 0.483 \text{ in}^3.$$

The total volume of the adapter cavity and port vent is;

$$V_t\big|_3 = V_b\big|_3 + V_v\big|_3 = 13.6 + 0.483 = 14.4 \text{ in}^3.$$

Since the available adapter volume is 16 in$^3$, blocking off 1.6 in$^3$ of volume to better match the ported speaker design would optimize the response.

Energy converting circuitry 66 in the preferred embodiment is an AC/DC switching power supply or an inductive transformer to provide an AC/AC conversion. The AC/DC approach, while more complicated, is preferred as it can have higher efficiency and trans-locates the circuitry from the electronic device to the adapter where generally lower cost components can be used due to the additional space. The alternate AC/AC approach has a typical frequency of the AC supply being 50 Hz or 60 Hz. These frequencies are near the desired low frequency (e.g. 70 Hz) of speaker 17 and thus there is some chance that intercoupling of the power frequency can occur in a wired cable which provides both for power distribution and audio interfacing. Using a DC signal can prevent the power intercoupling; however, there may still be some intercoupling due to transient loads required of the adapter from the electronic device. Since these loads vary depending on the use pattern of the electronic device, filtering them out can be challenging. It is therefore desirable to prevent this coupling from occuring in the first place. One alternative approach is to encode the audio signal before the interface such that the encoding reduces the intercoupling from the power distribution to the audio signal.

An alternate embodiment contemplated has the audio signal superimposed onto the power signal, thereby reducing the number of conductors in the cable from adapter 16 to electronic device 12. Additional circuitry is required in both electronic device 12 and adapter 16 to perform the superposition and decomposition of the signals. Additionally, the power supply inside electronic device 12 needs to be tolerant to the audio signal, which can act as a noise source on the input power signal. In this embodiment, a delta-sigma modulator 104 is used on the audio signal to highly oversample the audio signal. This modulation converts the analog signal to a high frequency digital signal where the quantization noise is shaped to the higher frequency portion of the signal content. This highly oversampled signal is at a much higher frequency (for a 1000 Hz and below audio signal, approximately 100 Khz) than the power signal. This signal is filtered out at adapter 16 using high pass filter 110 to eliminate the power signal. The filtered signal is then passed through discriminator 106 to restore the digital signal and the digital signal is filtered using digital or analog methods in low pass filter 102 to restore the analog audio signal while removing the shaped quantization noise.

What is claimed is:

1. An electronic system with enhanced audio, comprising:
   an electronic device, comprising:
      a power inlet for receiving and delivering power to said electronic device;
      an incoming power signal from an external power source coupled to said power inlet;
      an audio signal generated by said electronic device;
      a delta-sigma modulator having said audio signal as an input and outputting a modulated signal;
      means for superimposing said modulated signal onto said incoming power signal;
   a power adapter external to said electronic device, comprising:
      a mains receptacle;
      a power outlet coupled to supply power to said power inlet;
      means for converting energy from said mains receptacle and delivering it to said power outlet;
      a high pass filter receiving from said power outlet, said superimposed signal as an input and outputting a filtered digital signal;
      a discriminator receiving said filtered digital signal and outputting a recovered modulated signal;
      a low pass filter receiving said recovered modulated signal and outputting a low pass filtered recovered audio signal to a speaker.

2. The electronic system of claim 1, wherein said power adapter further comprises:
   a cavity that encloses said speakers to form a resonant chamber.

3. The electronic system of claim 2, wherein said power adapter further comprises:
   a vented port in said cavity.

* * * * *